US012489193B2

(12) United States Patent
Sun

(10) Patent No.: US 12,489,193 B2
(45) Date of Patent: Dec. 2, 2025

(54) RADIO HEATSINK, RADIO UNIT, AND BASE STATION

(71) Applicant: Telefonaktiebolaget LM Ericsson (publ), Stockholm (SE)

(72) Inventor: Xuejun Sun, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 205 days.

(21) Appl. No.: 18/271,405

(22) PCT Filed: Apr. 1, 2021

(86) PCT No.: PCT/CN2021/085006

§ 371 (c)(1),
(2) Date: Jul. 7, 2023

(87) PCT Pub. No.: WO2022/147916

PCT Pub. Date: Jul. 14, 2022

(65) Prior Publication Data

US 2024/0063522 A1 Feb. 22, 2024

(30) Foreign Application Priority Data

Jan. 8, 2021 (WO) ................ PCT/CN2021/070920

(51) Int. Cl.

*H01Q 1/02* (2006.01)
*H01P 1/207* (2006.01)
*H01Q 1/24* (2006.01)

(52) U.S. Cl.

CPC ............... *H01Q 1/02* (2013.01); *H01P 1/207* (2013.01); *H01Q 1/24* (2013.01)

(58) Field of Classification Search

CPC . H01Q 1/02; H01Q 1/24; H01Q 1/246; H01P 1/207; H01P 11/007; H01P 1/2053; H05K 7/20409; H05K 9/0056

See application file for complete search history.

(56) References Cited

U.S. PATENT DOCUMENTS

| | | | | |
|---|---|---|---|---|
| 11,605,885 | B2 * | 3/2023 | Lehman | H04W 76/40 |
| 2010/0207705 | A1 * | 8/2010 | Wang | H01P 1/213 333/100 |

(Continued)

FOREIGN PATENT DOCUMENTS

WO 2010/124594 A1 11/2010

OTHER PUBLICATIONS

International Search Report and Written Opinion with Transmittal dated Oct. 1, 2021 issued in International Patent Application No. PCT/CN2021/085006 (14 pages).

*Primary Examiner* — Hai V Tran

(74) *Attorney, Agent, or Firm* — Rothwell, Figg, Ernst & Manbeck, P.C.

(57) ABSTRACT

A radio heatsink, a radio unit, and a base station are disclosed. According to an embodiment, the radio heatsink (10) comprises a heatsink base (11) and a plurality of heatsink fins (12) extending from a first side of the heatsink base (11), wherein at least one portion (13) of the heatsink base (11) bulges at the first side toward the heatsink fins (12), a recess (14) opening to a second side of the heatsink base (11) that is opposite to the first side is formed at the portion (13), and the radio heatsink (10) further comprises a metal cavity filter (40) integrated with the heatsink base (11). According to another embodiment, the metal cavity filter (40) is separately formed and then inserted into the recess (14).

13 Claims, 5 Drawing Sheets

(56) References Cited

U.S. PATENT DOCUMENTS

| | | | | |
|---|---|---|---|---|
| 2012/0001809 | A1* | 1/2012 | Peng | H01Q 1/02<br>343/702 |
| 2014/0024413 | A1* | 1/2014 | Sun | H04W 88/085<br>455/561 |
| 2018/0192508 | A1* | 7/2018 | Sun | H01Q 9/00 |
| 2020/0365960 | A1 | 11/2020 | Kim et al. | |

* cited by examiner

RADIO HEATSINK, RADIO UNIT, AND BASE STATION

CROSS REFERENCE TO RELATED APPLICATIONS

This application is a 35 U.S.C. § 371 National Stage of International Patent Application No. PCT/CN2021/085006, filed Apr. 1, 2021, claiming a priority to International Patent Application No. PCT/CN2021/070920, filed Jan. 8, 2021, which is incorporated by this reference.

TECHNICAL FIELD

The present disclosure generally relates to the technical field of communication device, and more particularly, to a radio heatsink, a radio unit having the radio heatsink, and a base station having the radio unit.

BACKGROUND

This section introduces aspects that may facilitate better understanding of the present disclosure. Accordingly, the statements of this section are to be read in this light and are not to be understood as admissions about what is in the prior art or what is not in the prior art.

Base station (BS) is an important part of a mobile communication system, and may include a radio unit (RU) and an antenna unit (AU). In traditional BS solution, remote radio unit (RRU) and AU are separated as two independent units and hung on high constructions, like tall buildings, high walls, towers and lamp stands. Considering the installation/fixation/occupation, smaller volume and lighter weight is always an important evolution direction in BS design, including Legacy BS, Street Macro, Micro, Small Cell, and Advanced Antenna System (AAS).

Recent years, with the development of the 5th Generation (5G) communication, Multiple-Input and Multiple-Output (MIMO) technology is widely used, in which the demands for small size high performance radio are growing rapidly. Moreover, volume/size is always related to power and Passive Inter-Modulation (PIM) performance. The study of how to get better performance in limited size or how to get enough performance in minimum size becomes more and more important.

Methods for reducing the size of products such as BS may include: 1) reducing the size of each component to its minimum; and 2) designing a high-integrated module in which multiple components are integrated into a single module. For example, an AU may be integrated with an RRU to form an Active Antenna Unit (AAU); further, an AU may be integrated with a filter unit (FU) to form an antenna filter unit (AFU).

In traditional BS solution, metal cavity filter is most recommended because of its high quality factor (Q) value and power handling performance. In order to achieve high integration, however, ceramic waveguide (CWG) filter is widely used in 5G filter solutions. For example, in a radio architecture in which radio and antenna are integrated into one board, one side of the board is mounted with radio components, while the other side of the board is mounted with antenna array. In such a radio architecture, a monoblock CWG filter is soldered on the board by means of Surface Mounted Technology (SMT).

In the spectrum allocation all over the world, operator is more and more likely to get wide spectrum up to 200-400 MHz. In order to use one radio product to support different operators, it is strongly required to design wideband radio with 400-800 MHz bandwidth, or even up to 1 GHz or higher bandwidth. Based on this ultra-wide band requirement, very tough requirements are imposed on FU, which can only be satisfied by traditional metal cavity filter.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a compact radio architecture for wideband support, in which metal cavity filters are employed.

According to a first aspect of the disclosure, there is provided a radio heatsink comprising a heatsink base and a plurality of heatsink fins extending from a first side of the heatsink base. At least one portion of the heatsink base bulges at the first side toward the heatsink fins, and a recess opening to a second side of the heatsink base that is opposite to the first side is formed at the portion. The radio heatsink further comprises a metal cavity filter integrated with the heatsink base.

In an embodiment of the disclosure, the metal cavity filter comprises a plurality of cavities each including at least one resonant column, wherein a peripheral wall and a bottom wall of the metal cavity filter, separation walls between adjacent cavities, as well as the resonant columns are made integral with the heatsink base.

In an embodiment of the disclosure, the recess is covered with a metal sheet functioning as a filter cover.

According to a second aspect of the disclosure, there is provided a radio unit comprising a radio board and a radio heatsink according to the first aspect. A first surface of the radio board is assembled with the heatsink base of the radio heatsink at the second side of the heatsink base.

According to a third aspect of the disclosure, there is provided a radio unit comprising a radio board and a radio heatsink. The radio heatsink comprises a heatsink base and a plurality of heatsink fins extending from a first side of the heatsink base. At least one portion of the heatsink base bulges at the first side toward the heatsink fins, and a recess opening to a second side of the heatsink base that is opposite to the first side is formed at the portion. The radio unit further comprises a metal cavity filter arranged at the recess. A first surface of the radio board is assembled with the heatsink base of the radio heatsink at the second side of the heatsink base.

In an embodiment of the disclosure, radio elements are disposed on the first surface of the radio board.

In an embodiment of the disclosure, the metal cavity filter is spaced from the first surface of the radio board, and a distance between the metal cavity filter and the first surface of the radio board is set such that one or more of the radio elements at least partially protrude into the recess of the heatsink base.

In an embodiment of the disclosure, antenna elements are disposed on the second surface of the radio board that is opposite to the first surface.

In an embodiment of the disclosure, the metal cavity filter is connected to the radio board through RF connectors.

In an embodiment of the disclosure, a first RF connector serves as input to the metal cavity filter, and a second RF connector serves as output from the metal cavity filter.

In an embodiment of the disclosure, a distance between the first RF connector and the second RF connector is set such that one or more of the radio elements at least partially protrude into the recess of the heatsink base.

In an embodiment of the disclosure, each of the RF connectors is a contact pin or a mini pogo-pin.

According to a fourth aspect of the disclosure, there is provided a base station. The base station comprises a radio unit according to the second or third aspect.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
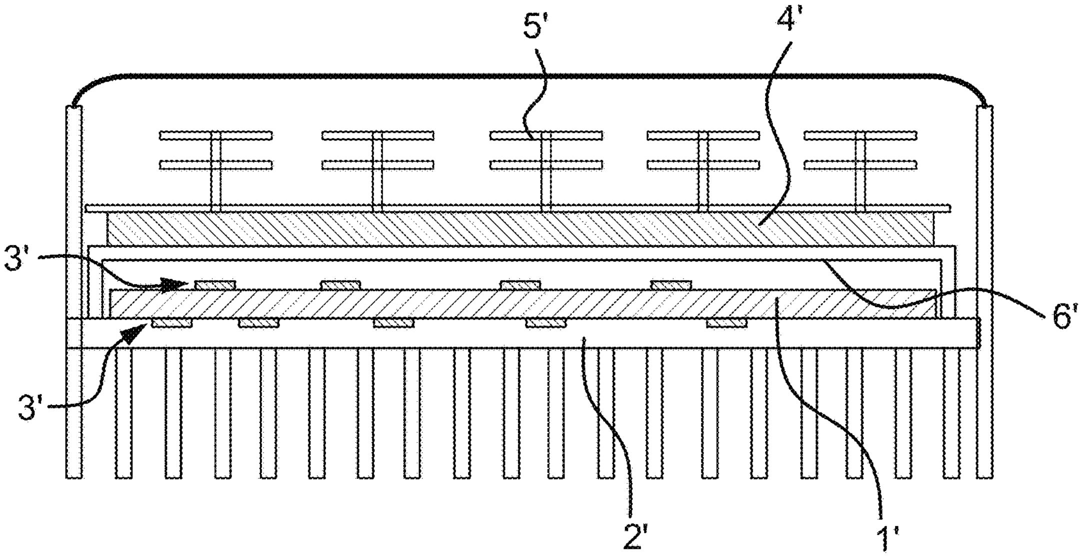
FIG. 1 is a diagram showing an existing radio solution with traditional architecture.

FIG. 1 shows an existing radio solution with traditional architecture. As shown in FIG. 1, a radio unit includes a radio board 1', a radio heatsink 2' assembled with the radio board 1', and radio components 3' disposed on both sides of the radio board 1'. A metal cavity filter 4' is disposed between multiple antenna elements 5' and an electromagnetic compatibility (EMC) cover 6' for the radio unit. With this existing radio solution, the tough requirements for wideband design can be satisfied, because a metal cavity filter 4' is employed. However, the product is much heavier and bigger.

Figure 2:
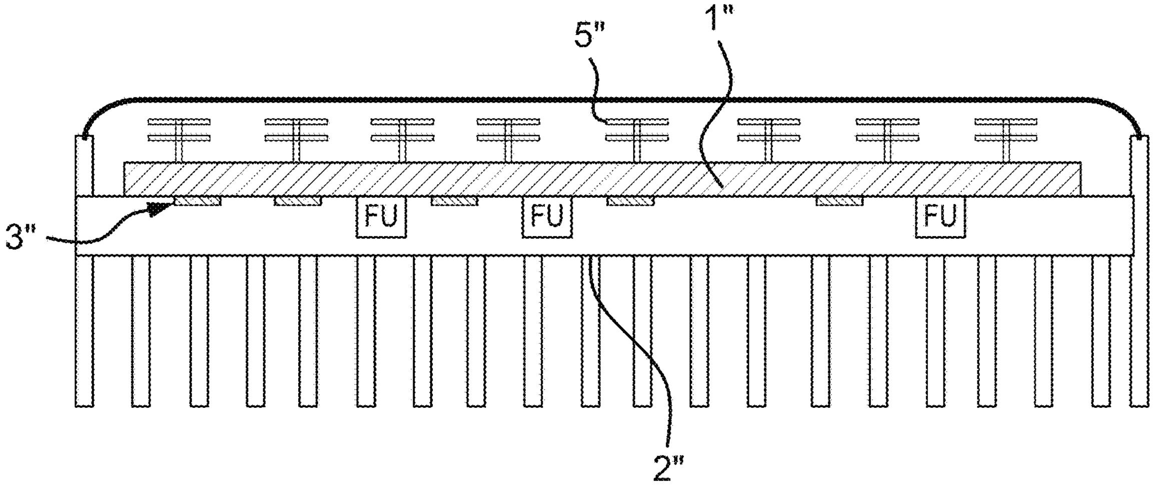
FIG. 2 is a diagram showing an existing integrated solution with CWG filters.

FIG. 2 shows an existing integrated solution with CWG filters. As shown in FIG. 2, a radio unit includes a radio board 1", a radio heatsink 2" assembled with the radio board 1", and radio elements 3' disposed between the radio board 1" and the radio heatsink 2". Multiple antenna elements 5" are mounted on the upper side of the radio board 1", and multiple filter units (FUs) are mounted on the lower side of the radio board 1". All the radio elements 3" and the antenna elements 5 are soldered on the radio board 1" by means of SMT. It has super high integration level with best size/weight and cost, but FU is a limitation for wideband support. Normally surface mounted type of CWG filters have competitive weight/size/cost, but they are still designed with worse performance than metal cavity filters. Unfortunately, the integrated one board concept shown in FIG. 2 is based on surface mounted filters, which limits product level performance. Thus, the one board solution is limited to selected 3GPP band, and is not suitable to the complete product portfolio.

In view of the above, the present disclosure proposes a new solution to combine advantages of both metal cavity filter performance and one board solution integration level, which makes it possible to achieve better size, weight, cost with better performance at the same time. In the present disclosure, a metal cavity filter can be, for example, a traditional metal cavity filter, or a metal cavity waveguide filter with dielectric resonator.

Figure 3:
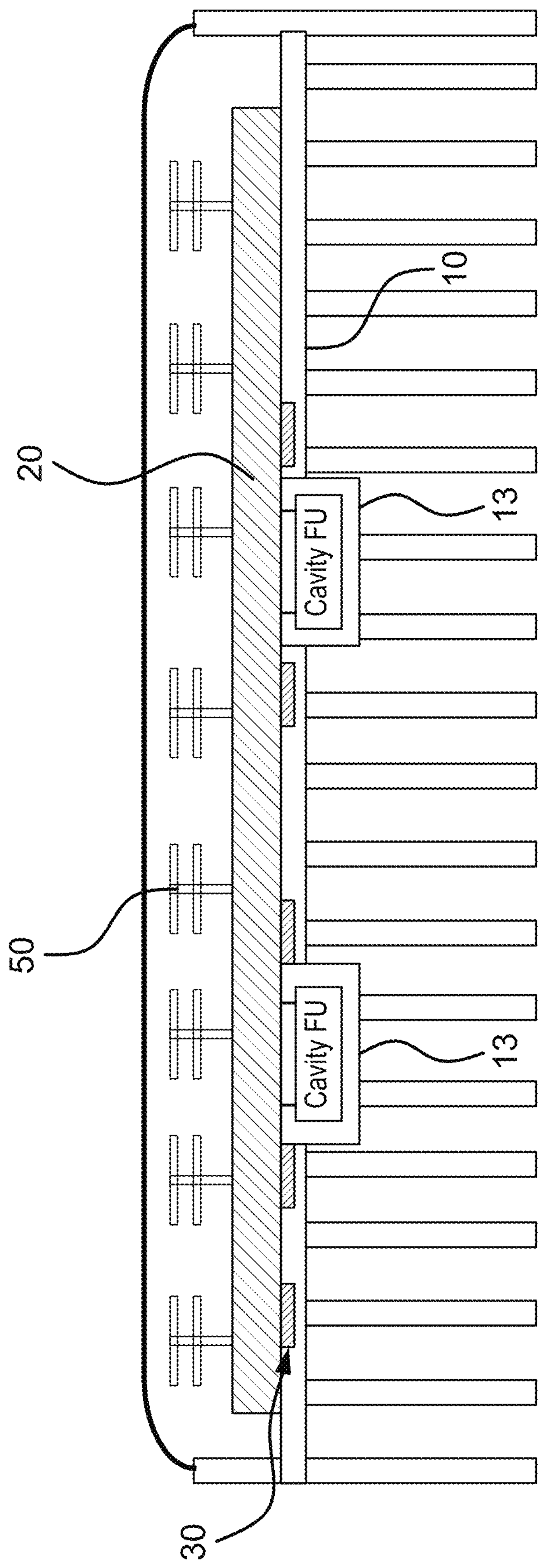
FIG. 3 is a diagram showing a radio solution according to an embodiment of the disclosure.

FIG. 3 shows a radio solution according to an embodiment of the disclosure. There is provided a radio heatsink 10, which includes a heatsink base and a plurality of heatsink fins extending from a bottom side of the heatsink base. A radio board 20 is assembled with the heatsink base of the radio heatsink 10 at the top side of the heatsink base. Multiple radio elements 30 are disposed on the lower surface of the radio board 20. Multiple antenna elements 50 are disposed on the upper surface of the radio board 20.

The heatsink thickness is partly increased to hold at least one metal cavity filter (cavity FU), while the other parts are still in a normal shape. In other words, at least one portion 13 of the heatsink base bulges at the bottom side toward the heatsink fins. At the top side of the heatsink base, the portion 13 is provided with a recess 14. The metal cavity filter is arranged at the recess 14. Unlike CWG filters which are usually surface mounted on the radio board, the metal cavity filter embedded into the radio heatsink 10 is connected to the radio board 20 through two RF connectors.

Figure 4:
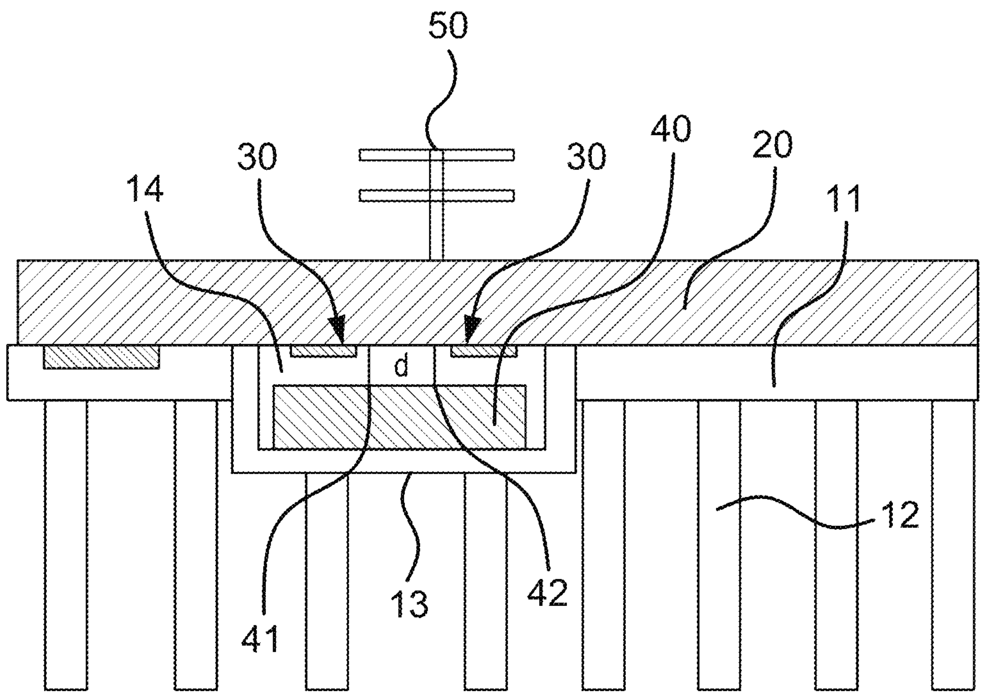
FIG. 4 is an enlarged diagram showing a part of a radio unit according to an embodiment of the disclosure.

FIG. 4 is an enlarged diagram showing a part of a radio unit according to an embodiment of the disclosure. Similar to the embodiment shown in FIG. 3, the radio unit according to this embodiment comprises a radio heatsink 10, a radio board 20, multiple radio elements 30, at least one metal cavity filter 40, and multiple antenna elements 50. The radio heatsink 10 includes a heatsink base 11 and a plurality of heatsink fins 12 extending from a bottom side of the heatsink base 11. The lower surface of the radio board 20 is assembled with the heatsink base 11 of the radio heatsink 10 at the top side of the heatsink base 11. The multiple radio elements 30 are disposed on the lower surface of the radio board 20. The multiple antenna elements 50 are disposed on the upper surface of the radio board 20. A portion 13 of the heatsink base 11 bulges at the bottom side toward the heatsink fins 12. At the top side of the heatsink base, the portion 13 is provided with a recess 14. The metal cavity filter 40 is arranged at the recess 14 and is connected to the radio board 20 through two RF connectors 41, 42.

The radio unit shown in FIG. 3 or FIG. 4 may be manufactured as follows. First, the metal cavity filter 40 is inserted into the recess 14 of the radio heatsink 10, and the radio elements 30 and the antenna elements 50 are soldered onto the opposite surfaces of the radio board 20 by means of SMT. Then, the double-side mounted radio board 20 is assembled onto the radio heatsink 10, with direct RF connections 41, 42 being connected between the radio board 20 and the metal cavity filter 40. As a non-limitative example, the RF connection can be a contact pin or a mini pogo-pin solution. There is no soldering connection between the radio board 20 and the metal cavity filter 40. One of the two RF connectors (for example, RF connector 41) serves as input to the filter from the radio board 20, and the other one (for example, RF connector 42) serves as output from the filter to the radio board 20.

In view of the RF connectors, the upper surface of the metal cavity filter 40 is spaced from the lower surface of the radio board 20, as shown in FIG. 3 and FIG. 4. The distance between the upper surface of the metal cavity filter 40 and the lower surface of the radio board 20 can be flexibly set depending on different design purpose. For example, the distance can be designed to be as small as possible to save more space (see FIG. 3), but it can also be in proper range so that some radio components (see FIG. 4: two radio elements 30) can be housed in the recess 14 of the radio heatsink 10. It should be noted that the radio elements 30 may partially protrude into the recess 14.

Also, the distance d (FIG. 4) of the two RF connections 41, 42 can be flexibly set depending on different design purpose. The distance d can be optimized to make filter design much easier, while it can also be designed to be as small as possible to leave more space for mounting radio board components. This also need tradeoff in different designs. In FIG. 4, two radio elements 30 are housed in the recess 14. In another embodiment, three or more components can be placed in the recess 14 to optimize radio board area. It is also possible to dispose one or more components between the RF connector 41 and the RF connector 42, if applicable.

Figure 5:
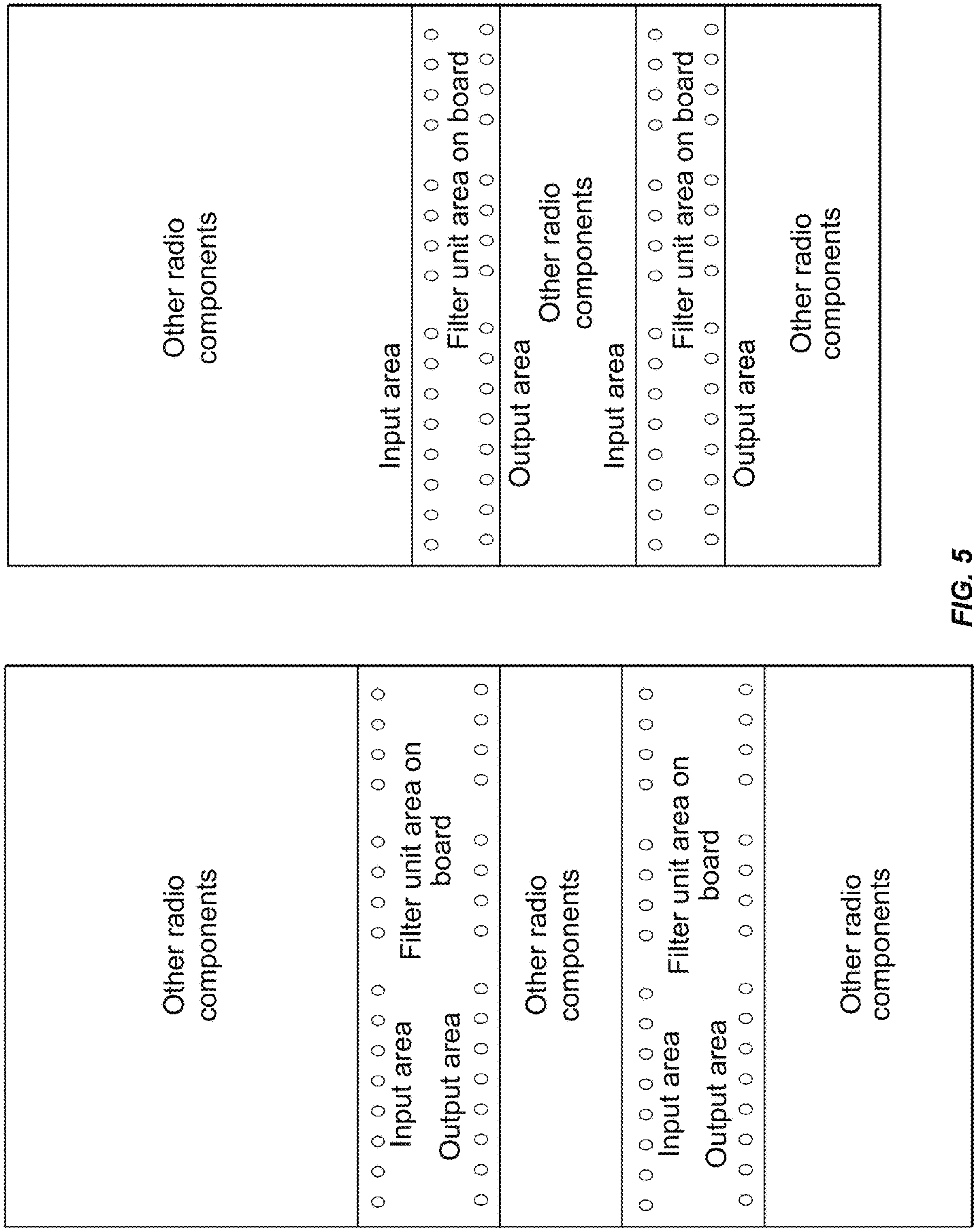
FIG. 5 is a diagram showing a comparison of radio board size between an existing radio unit and a radio unit according to an embodiment of the disclosure.

FIG. 5 illustrates a comparison of radio board size between an existing radio unit such as that shown in FIG. 2 and a radio unit according to the disclosure as shown in FIG. 4 The existing radio board size is shown on the left part of FIG. 5, and the radio board size according to FIG. 4 is shown on the right part of FIG. 5. It can be seen that for the radio board in FIG. 4, the filter unit area can be reduced, and the total board size can also be reduced. This is a quite big benefit for complete product design.

In addition, a metal cavity filter with a pin connection on the back side makes it possible to integrate the metal cavity filter together with the radio heatsink as one part, which makes the complete solution even simple. This change is shown in FIG. 6 and FIG. 7.

Figure 6:
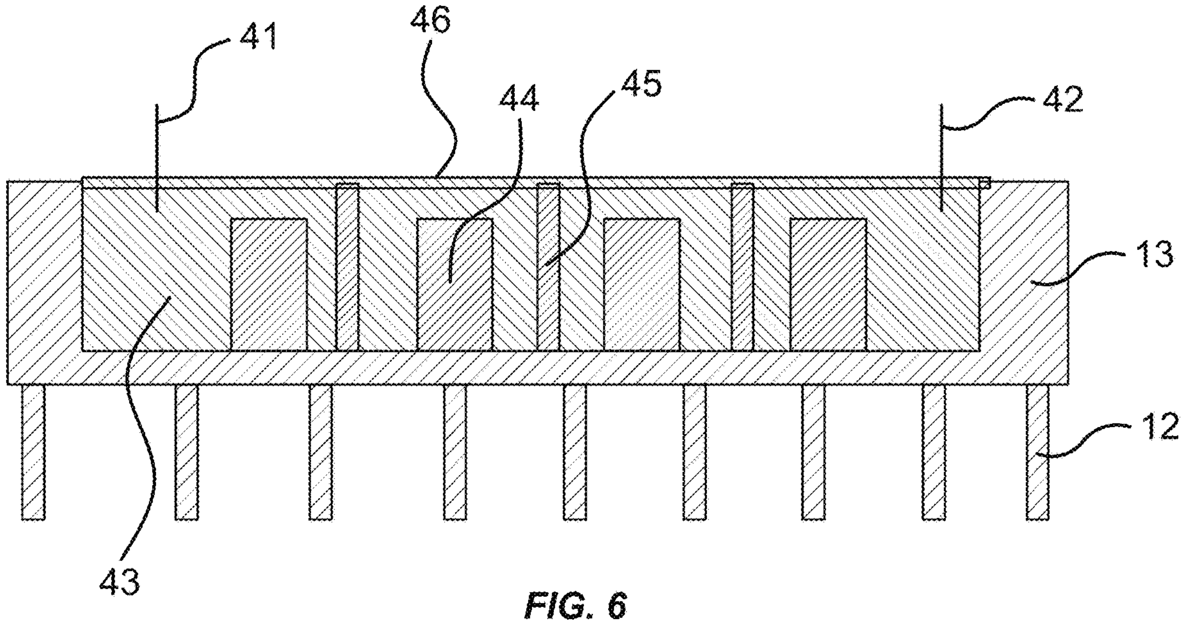
FIG. 6 is a diagram showing a radio heatsink with an integrated metal cavity filter according to an embodiment of the disclosure.

FIG. 6 shows a radio heatsink with an integrated metal cavity filter according to an embodiment of the disclosure. FIG. 7 shows a radio heatsink with an independent metal cavity filter according to another embodiment of the disclosure.

As shown in FIG. 6, the metal cavity filter 40 comprises a plurality of cavities 43 each including at least one resonant column 44. A peripheral wall and a bottom wall of the metal cavity filter 40, separation walls 45 between adjacent cavities 43, as well as the resonant columns 44 are made integral with the heatsink base 11 at the portion 13. The recess 14 is covered with a metal sheet 46 functioning as a filter cover.

Figure 7:
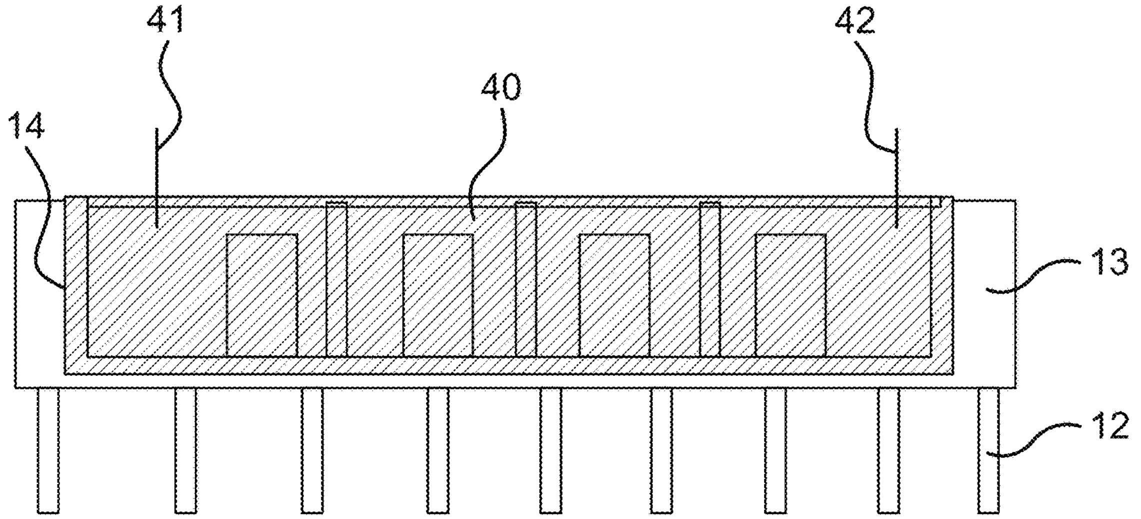
FIG. 7 is a diagram showing a radio heatsink with an independent metal cavity filter according to an embodiment of the disclosure.

FIG. 7 differs from FIG. 6 in that the metal cavity filter 40 is separately formed and then inserted into the recess 14, like in the embodiments shown in FIG. 3 and FIG. 4.

The present disclosure also relates to a base station comprising the above-mentioned radio unit.

Advantages of embodiments of the disclosure will be described below.

Integrated radio and antenna solution with one board inside 5G radio becomes more and more mature and it might be used in all new generation AAS products. But surface mounted filter in this concept has limited the application in wideband and some very tough single band product. This invention breaks the major performance bottleneck in one board solution and it introduces compatible solution for surface mounted filter and metal cavity filter. This will achieve modular design and extend integrated solution to all product portfolio.

According to embodiments of the present disclosure, the radio can still keep the best integration level: only one radio board together with one radio heatsink. At the same time, high performance metal cavity filter in one board solution is introduced to support all wideband and tough band requirement, as compared to existing one board solution with CWG filters shown in FIG. 2.

In order to achieve modular design, it is also possible to keep same radio board layout and make the connection compatible between soldering CWG filter and connection to metal cavity filter.

There might be some thermal performance loss due to a little shorter cooling fin in the cavity filter part. But metal cavity filter itself is good at thermal conductivity. It can also transfer filter heat to outside of the product. This can also improve filter unit thermal performance.

Metal cavity filter with pin connection on the back side makes it possible to integrate the metal cavity filter together with the radio heatsink as one part, which makes the complete solution even simple.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A radio heatsink comprising:

a heatsink base having a first side and a second side that is opposite to the first side;

a plurality of heatsink fins attached to the first side of the heatsink base and extending in a direction away from the first side of the heatsink base, wherein at least a first portion of the heatsink base bulges in the direction in which the heatsink fins are extending, thereby forming a recess; and a metal cavity filter positioned within the recess of the radio heatsink.

2. The radio heatsink according to claim 1, wherein the metal cavity filter comprises a plurality of cavities each including at least one resonant column, and a peripheral wall and a bottom wall of the metal cavity filter, separation walls between adjacent cavities, as well as the resonant columns are made integral with the heatsink base.

3. The radio heatsink according to claim 1, wherein the recess is covered with a metal sheet functioning as a filter cover.

4. A radio unit comprising a radio board and the radio heatsink according to claim 1, wherein a first surface of the radio board is assembled with the heatsink base of the radio heatsink at the second side of the heatsink base.

5. The radio unit according claim 4, wherein radio elements are disposed on the first surface of the radio board.

6. The radio unit according to claim 5, wherein the metal cavity filter is spaced from the first surface of the radio board, and a distance between the metal cavity filter and the first surface of the radio board is set such that one or more of the radio elements at least partially protrude into the recess of the heatsink base.

7. The radio unit according to claim 4, wherein antenna elements are disposed on the second surface of the radio board that is opposite to the first surface.

8. The radio unit according to claim 4, wherein the metal cavity filter is connected to the radio board through RF connectors.

9. The radio unit according to claim 8, wherein a first RF connector serves as input to the metal cavity filter, and a second RF connector serves as output from the metal cavity filter.

10. The radio unit according to claim 9, wherein a distance between the first RF connector and the second RF connector is set such that one or more of the radio elements at least partially protrude into the recess of the heatsink base.

11. The radio unit according to claim 8, wherein each of the RF connectors is a contact pin or a mini pogo-pin.

12. A radio unit comprising:

a radio board;

a radio heatsink comprising a heatsink base having a first side and a second side that is opposite to the first side and a plurality of heatsink fins attached to the first side of the heatsink base and extending in a direction away from the first side of the heatsink base, wherein at least a first portion of the heatsink base bulges in the direction in which the heatsink fins are extending, thereby forming a recess; and a metal cavity filter positioned within the recess of the radio heatsink, wherein a first surface of the radio board is assembled with the heatsink base of the radio heatsink at the second side of the heatsink base.

13. A radio unit comprising:

a circuit board having a first side and a second side opposite the first side, the first side of the circuit board having a first portion, a second portion, and a third portion;

a heatsink comprising:

a first portion having a first side and a second side opposite the first side, the first side of the first portion of the heatsink facing and abutting the first portion of the first side of the circuit board;

a second portion having a first side and a second side opposite the first side, the first side of the second portion of the heatsink facing the second portion of the first side of the circuit board and spaced apart from the second portion of the first side of the circuit board by a distance of d units of distance, where d>0, thereby forming a gap between the first side of the second portion of the heatsink and the first side of the second portion of the circuit board;

a third portion having a first side and a second side opposite the first side, the first side of the third portion of the heatsink facing and abutting the third portion of the first side of the circuit board;

a first plurality of heatsink fins attached to the second side of the first portion of the heatsink; and a second plurality of heatsink fins attached to the second side of the third portion of the heatsink; and a metal cavity filter positioned in the gap between the first side of the second portion of the heatsink and the first side of the second portion of the circuit board.

* * * * *